(12) United States Patent
Lipawsky

(10) Patent No.: US 7,661,815 B2
(45) Date of Patent: *Feb. 16, 2010

(54) EYEFRAME WITH INTERCHANGEABLE LENSPIECES HELD BY A MAGNETIC CLOSURE AND INTERCHANGEABLE LENS SYSTEM

(76) Inventor: Steven R. Lipawsky, 4151 NW. 124th Ave., Coral Springs, FL (US) 33065

( * ) Notice: Subject to any disclaimer, the term of this patent is extended or adjusted under 35 U.S.C. 154(b) by 0 days.

This patent is subject to a terminal disclaimer.

(21) Appl. No.: 12/272,605

(22) Filed: Nov. 17, 2008

(65) Prior Publication Data

US 2009/0079930 A1    Mar. 26, 2009

Related U.S. Application Data

(63) Continuation-in-part of application No. 11/324,465, filed on Jan. 3, 2006, now Pat. No. 7,452,069.

(60) Provisional application No. 60/680,238, filed on May 12, 2005.

(51) Int. Cl.
  *G02C 9/00* (2006.01)
(52) U.S. Cl. ........................... 351/47; 351/57
(58) Field of Classification Search .............. 351/47, 351/48, 57, 58, 44, 41, 124, 158
See application file for complete search history.

(56) References Cited

U.S. PATENT DOCUMENTS

| | | | |
|---|---|---|---|
| 2,738,709 A | 3/1956 | Matthews et al. | |
| 4,176,921 A | 12/1979 | Matthias | |
| 4,523,819 A | 6/1985 | Dianitsch et al. | |
| 4,759,622 A | 7/1988 | Schmidthaler | |
| 4,822,158 A | 4/1989 | Porsche | |
| 4,834,523 A | 5/1989 | Porsche | |
| 5,048,944 A | 9/1991 | Porsche | |
| 6,283,591 B1 | 9/2001 | Chen | |
| 6,352,342 B1 | 3/2002 | Huang | |
| 6,478,420 B2 | 11/2002 | Xiang | |
| 6,604,822 B1 | 8/2003 | Chen | |
| 6,637,878 B2 | 10/2003 | Huang | |
| 6,705,721 B1 | 3/2004 | Chen | |
| 6,789,893 B1 | 9/2004 | Hong | |
| 6,866,384 B2 | 3/2005 | O'Connor et al. | |
| 6,866,385 B2 | 3/2005 | Madison | |
| 6,869,179 B2 | 3/2005 | Friedman | |
| 6,869,180 B1 | 3/2005 | Kidouchim | |
| 7,244,023 B1 | 7/2007 | Hsiao | |
| 7,452,069 B2 * | 11/2008 | Lipawsky | 351/47 |
| 2005/0052613 A1 | 3/2005 | Kidouchim | |

OTHER PUBLICATIONS

Serway, Physics: For Scientists and Engineers with Modern Physics, 1990, pp. 835-873, 3rd ed, Saunders College Publishing, Philadelphia, US.

* cited by examiner

*Primary Examiner*—Hung X Dang
(74) *Attorney, Agent, or Firm*—Loren Donald Pearson; Fleit Gibbons Gutman Bongini & Bianco PL

(57) ABSTRACT

An eyeframe system includes a rimwire and an interchangeable lenspiece. A hinged closure on the rimwire fastens the lenspiece to the rimwire. The closure includes a magnetic closure that slides beneath a nose bridge of the rimwire. The closure is held closed by mechanical and magnetic forces. The system can include a plurality of different lenspieces that are interchanged to attach lenses with different qualities.

20 Claims, 8 Drawing Sheets

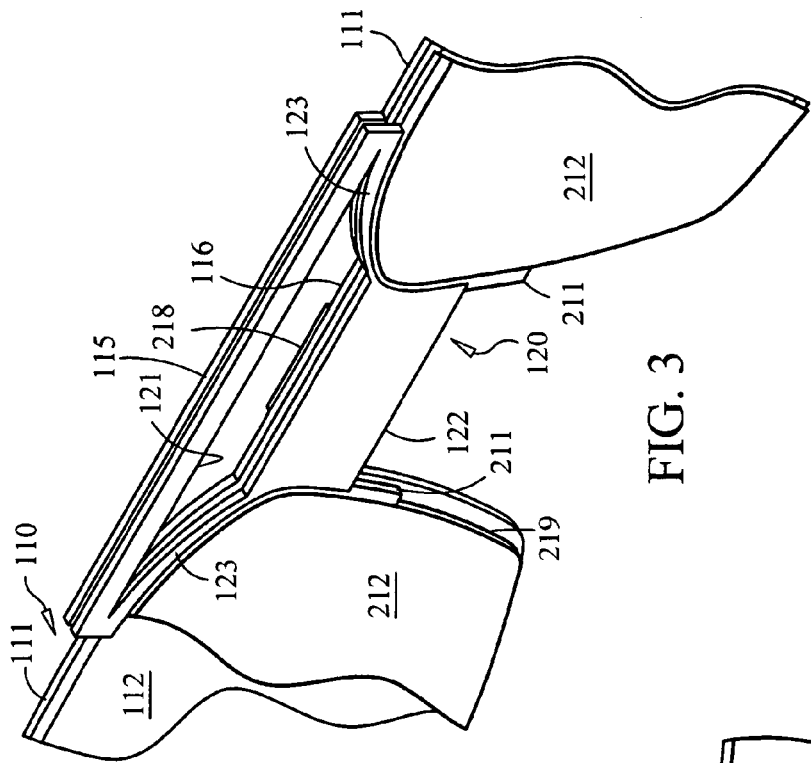
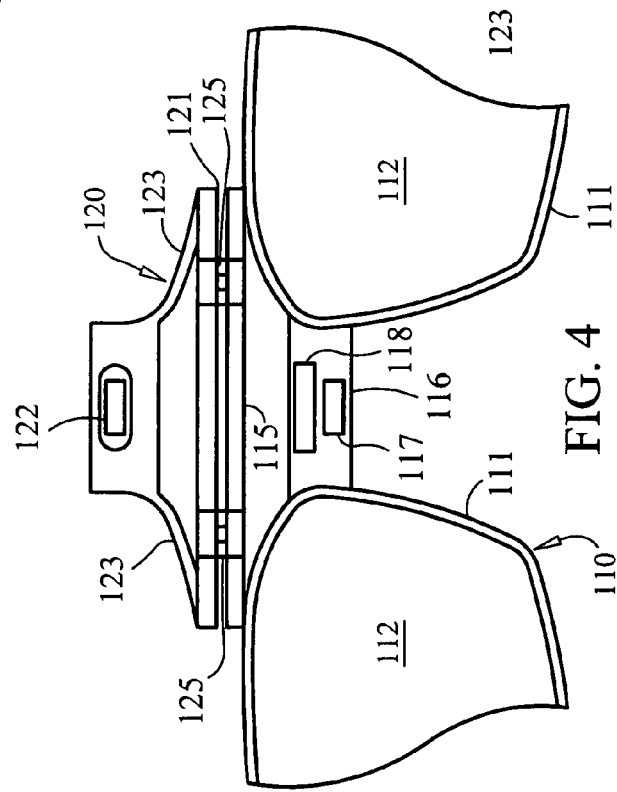

EYEFRAME WITH INTERCHANGEABLE LENSPIECES HELD BY A MAGNETIC CLOSURE AND INTERCHANGEABLE LENS SYSTEM

CROSS-REFERENCE TO RELATED APPLICATIONS

This application is a Continuation-In-Part of U.S. patent application Ser. No. 11/324,465, filed Jan. 3, 2006, now U.S. Pat. No. 7,452,069, which claims the benefit of U.S. Provisional Application No. 60/680,238, filed May 12, 2005.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to eyeglasses with interchangeable lenses.

2. Description of the Related Art

Eyeglasses having exchangeable lenses or lens assemblies offer several advantages over conventional eyeglasses having fixed lenses. For example, in the case of sunglasses, different pairs of lenses can be provided for varying light conditions. For example, polarized lenses are used to protect the eyes against ultraviolet rays and reduce glare. Systems exist that allow for different colored lenses to be used in different light conditions. In the case of lens and/or frame damage, a single component can be replaced more economically than purchasing an entirely new pair of eyeglasses.

Exchangeable lens eyeglasses have been known for some time but older configurations have had significant shortcomings in that they are generally mechanically complex, making them difficult to use. Other configurations require substantial mutual deformation of the lens and the front component of the frame making insertion and removal of a lens cumbersome and difficult.

Recently introduced exchangeable eyeglass designs have overcome these shortcomings by making replacement of the lenses convenient. In one structure disclosed in U.S. Pat. No. 4,176,921, the eyeglass front is disclosed as being made of wire with complete rims (rims completely encompassing the lenses). Soldered to the wire rims are two spaced lower prongs for supporting each lens. An additional prong extends adjacent the temple piece, and is either integral with the rim, or is secured in another soldered joint. The lenses, which are stored without a frame until ready for use, are inserted from above until they are embraced by the prongs. A metal lever is hinged to the bridge joining the rims and carries a prong for each lens. The lever is rotated downwardly to a holding position, to prevent upward movement of the lenses. Separate plastic nose pads are attached to the wire front. The eyeglasses shown in this patent have met with widespread success but they are relatively expensive due to the complete wire front, which is typically formed of a wire stock, and must be soldered in a separate manufacturing step to form a closed loop. Also, a complete wire rim is limited in its ability to accommodate designer materials and colors.

Complete wire rims, especially those for mating with exchangeable lenses can present a problem in that the wire rims are susceptible to bending or other deformation, which destroys the relatively close-tolerance lens-conforming configuration. Also, the lenses themselves are unsupported during storage. Plastic and polycarbonate lenses may tend to warp if stored under conditions of excessive heat or pressure and can also scratch relatively easily.

An eyeglass configuration for a front assembly having partial rims (rims which extend about the periphery of typically only the upper or lower portion of the lenses) is disclosed in U.S. Pat. No. 4,523,819. The eyeglass front includes wires or threads that are received in grooves in the exposed bottom edges of the lenses. The threads are fastened to one end of their associated partial rim and meet at the bridge section of the front where their remaining ends are held by the free ends of pivotal levers for tensioning the threads. A retainer clip, which is hinged to a lower bridge member, overlies the lever free ends to maintain the levers in their tensioning positions. The front used in the eyeglasses is preferably formed of metal to accommodate the wear occasioned by the use of pivoting components, to permit the attachment of prongs, and to provide adequate strength for tensioning. While generally satisfactory, the eyeglasses shown in this patent present some difficulties for wearers who have limited manual dexterity or who are engaged in outdoor winter sports or other activities requiring gloves.

Another embodiment of an interchangeable eyeglass configuration is shown in U.S. Pat. No. 2,738,709. An eyeglass frame made of wire is provided for mounting two lenses, and includes an intermediate metal bridge portion. The wire frame is adapted to be received behind an overlying plastic frame containing the customary temple pieces for engaging the temples and ears of a wearer. Both the wire frame and the overlying plastic frame have complete rims that completely encircle the lenses. Recesses are provided in the rear of the overlying plastic frame (adjacent the wearer's face) to receive the entire rim portions of the wire frame. Two hingeable latches are provided on the overlying plastic frame pieces to secure the wire frame thereto. This interchangeable eyeglass configuration has considerable mass (i.e. bulk) and is therefore relatively heavy. The overlying plastic frame must be sufficiently bulky at its bridge and rim portions to hide or mask the underlying wire frame, and the front of the overlying plastic frame has enlarged bulk adjacent its temple portions to accommodate the separately formed hingeable latches. This configuration relies on frictional engagement between the wire and plastic bridges, which are susceptible to wear over years of use. To compensate for this wear, the temple pieces can be adjusted to increase pressure on the wearer's ear, thereby pressing the bridge portions together, but this may be uncomfortable over extended wearing times.

Eyeglasses with interchangeable lenses are known in the prior art. Examples include U.S. Pat. Nos. 4,759,622, 4,822, 158, and 4,834,523. These patents use mechanical closures or clasps to lock the lenses in place. The mechanical clasp wears with usage and loses the ability to lock or "snap" closed. Eventually mechanical clasps wear to the point of not locking. This leads to the interchangeable lens not being locked in the eyeglasses allowing it to unintentionally fallout.

Another problem with mechanical clasps is that they require physical force to lock and unlock them. For a secure hold, the amount of force may be enough to crack or chip the lens if the force is accidentally transferred to the lens. Accordingly, a clumsy effort to lock or unlock the bridge could lead to enough force to damage the lens to be brought onto lens.

Kidouchim, US. Patent Application No. US 2005/0052613, and Kidouchim, U.S. Pat. No. 6,869,180, show a system for attaching auxiliary lenses to an eyeframe that includes customary, non-removable primary lenses. A hinge is included to pivot the auxiliary lens into and out of position with the primary lens. The hinge does not release the primary lens. While a magnet is included to hold the auxiliary lenses in different positions 68 and 70, the application does not teach to use the magnet to lock a bridge closed so as to prevent the primary lenses from accidentally falling from the eyeframe.

In U.S. Pat. No. 6,789,893, Hong discloses a magnetically attached auxiliary lens system. The auxiliary lenses swivel on a hinge. The magnets are used to attach the support to the eyeframe not to lock the lenses in position.

In U.S. Pat. No. 6,637,878, Huang teaches a pivoting auxiliary lens system that is attached magnetically to a pair of eyeglasses. Huang does not show a hinged bridge that magnetically closes to hold a set of interchangeable primary lenses.

In U.S. Pat. Nos. 6,604,822 and 6,283,591, Chen teaches a pivoting auxiliary lens that attaches magnetically to a pair of eyeglasses. Chen does not show a hinged bridge that magnetically closes to hold a primary set of interchangeable lenses.

In U.S. Pat. No. 6,352,342, Huang teaches a pivoting auxiliary lens that attaches magnetically to a pair of eyeglasses. Huang does not show a hinged bridge that magnetically closes to hold a primary set of interchangeable lenses.

In U.S. Pat. No. 5,048,944, Porsche teaches eyeglasses with interchangeable primary lenses. The eyeglasses include a rimwire, a nose bridge, and a hinged closure. The retaining clip closes mechanically by snapping into place. The mechanical closure is subject to wear and permanent deformation and, as the retaining clip becomes permanently deformed, the retaining clip will fail to retain the lenses.

In U.S. Pat. No. 4,176,921, Matthias teaches eyeglasses with interchangeable primary lenses. The eyeglasses include a rimwire, a nose bridge, and a hinged closure. The retaining clip closes mechanically by snapping into place. The mechanical closure is subject to wear and, as the retaining clip becomes permanently deformed, the retaining clip will fail to retain the lenses.

In U.S. Pat. No. 6,869,179, Friedman teaches a mechanical clip for attaching an auxiliary lens to eyeglasses. In U.S. Pat. No. 6,866,384, Madison teaches a magnetic attachment for auxiliary lenses to primary eyeglasses. In U.S. Pat. No. 6,478,420, Xiang teaches magnetic attachments that allow rimless auxiliary lenses to be attached to rimless primary lenses.

In U.S. Pat. No. 4,523,819, Dianitsch et al. improve the Porsche design and adds a ratcheted wire partially around the perimeter of the lenses to secure them.

In U.S. Pat. No. Porsche 4,834,523, Porsche teaches collapsible eyewear with interchangeable primary lenses. Each lens has a plurality of notches that hold the lenses. The frame opens at a hinge at the stem.

In U.S. Pat. No. 4,822,158, Porsche teaches an interchangeable primary lens that attaches to a frame by a hinged bridge that mechanically closes. Porsche '158 does not teach a magnetic closure on the bridge. Each lens must be individually inserted. Holding both lenses while closing the closure requires three hands. Therefore, inserting the lenses and closing the closure is difficult and time consuming. The lenses can be scratched during installation.

In U.S. Pat. No. 4,759,622, Scmidthaler teaches a mechanical snapping bridge piece that releases interchangeable primary lenses. The bridge piece is not hinged. No magnetic closure is taught—just a snap.

Prior-art examples that include magnets fail to hide the magnets. That is, the magnets that attach auxiliary lenses are visible. These magnets, when visible, disturb the aesthetic norm of eyeglass frames, which typically have no magnets visible. Accordingly, a need exists for eyeframes with interchangeable lenspieces that attach magnetically with magnets that are not visible. Not only should the magnets not be visible, the eyeframe with an auxiliary lenspiece should appear as much as possible as an eyeframe that only includes primary lens.

BRIEF SUMMARY OF THE INVENTION

It is accordingly an object of the invention to provide eyeglasses with magnetic closure for holding interchangeable lenses, which overcome the above-mentioned disadvantages of the heretofore-known devices and methods of this general type.

With the foregoing and other objects in view there is provided, in accordance with the invention, an eyeframe for use with interchangeable lenspieces, i.e. interchangeable lenses and any surrounding rimwire. The eyeframe includes a rimwire and a closure. The closure is held magnetically closed. Interchangeable eyeglass lenses can be held easily between the rimwire and the closure. The closure prevents the interchangeable lenses from unintentionally separating from the eyeframe. In an opened position, the closure allows the removal and interchanging of lenses. In a closed position, the closure prevents the lenses from being removed from the eyeframe. Because the closure is magnetic, the closure does not wear down with use. In addition, unlike mechanical snap closures, the magnetic closure according to the invention is operable with only enough force to overcome the magnets and (i.e. opened and closed) without the force that could crack the lenses.

The rimwire, similar to typical eyeglasses, forms two lens frames (i.e. loops) and a nose bridge interconnecting the two lens frames. A first magnetic fastener is connected to the rimwire, and more preferably to the nose bridge of the rimwire. The closure includes a second magnetic fastener. Both of the magnetic fasteners are made of magnetic material. At least one, and perhaps both, of the magnetic fasteners is a magnet. The magnetic fasteners attract each other and thereby attract the closure to the rimwire to sandwich the interchangeable lenspiece between the nose bridge and the rimwire, thereby holding it as long as the closure remains closed.

A rimlock may exist where two parts of the rimwire are joined. A rimlock is formed where two portions of a lens frame are connected typically by a screw through two threaded flanges. If a rimlock is present, the screw can be removed; the lens previously held by the now open lens frame can be exchanged. Rimlocks are typically located on the temple of the eyeframes, where the stems connect to the lens frames.

The rimwire can include a brow bridge that interconnects the two lens frames. A closure hinge can be included to interconnect the brow bridge and the closure. The closure swings on the closure hinges between the open and closed position.

The rimwire may be "rimless". "Rimless" rimwires are in fact not truly rimless, they are semirimless. Rimless rimwires typically have a portion that is a traditional wire frame while the remainder is a thin, nearly invisible monofilament that sits in a groove formed along the edge of the lens. The monofilament is so narrow and nested that it is practically invisible and therefore appears "rimless".

Truly rimless (also known as three-piece mounts) eyeglasses can be utilized with the closure according to the invention to attach interchangeable lenspieces. In these rimless eyeglasses, the stems connect usually by screws) directly into the lens. A nose bridge is screwed into each lens to interconnect the lenses. As in other embodiments of eyeglasses, a closure according to the invention can work in conjunction with the nose bridge of the truly rimless eyeglasses to attach and detach interchangeable lenspieces.

In embodiments of rimwires having a nose bridge and a brow bridge, a trapezoid is defined within the rimwire. The closure can also be trapezoidal shape (formed by the closure nose bridge, the closure brow bridge, and the closure legs) and can be configured to overly the trapezoidal region of the eyeframe.

In embodiments having only a nose bridge (and no brow bridge), the closure is rectangular and overlies the brow bridge and lenspiece brow bridge.

To help support the lenses on the eyeframe, at least one prong can be attached to each lens frame to provide stability and balance. The auxiliary clip helps to support the interchangeable lenspiece on the eyeframe and provide balance and stability. A prong is soldered onto each temple of the interchangeable lenspiece. The prong abuts the stem of the eyeframe. If a rimlock is present, the prong can rest on the rimlock.

The nose bridge of the eyeframe and the nose bridge of the interchangeable lenspiece can include a tongue that mates with a respective groove. The tongue may be on the interchangeable lenspiece and the groove on the eyeframe, or vice versa. By making the tongue and groove any shape but round, the interchangeable lenspiece is prevented from rotating relative to the eyeframe.

The interchangeable lens of the interchangeable lenspiece may be a primary lens; i.e. no lenses are held in the underlying eyeframe. When the primary lens is interchangeable, different lenses can be used depending on the situation. For example, bifocals, progressive prescription lenses, sunglasses, reading glasses, or plano safety glasses can be interchanged. Thus, a system is created that allow a common eyeframe to be shared with various interchangeable lenspieces.

In addition, the interchangeable lens can be an auxiliary lens that overlies a primary lens held in the rimwire of the eyeframe. In the case of interchangeable auxiliary lenses, a primary lenses is permanently included within each lens frame. The advantage of this system is that a prescription lens can be the permanent primary lens. A group of exchangeable auxiliary lenses can be interchanged and combined with the primary lens to allow the eyeglasses to be adapted to different situations. For example, the primary lens can be a prescription lens and the interchangeable lens can be exchangeable to allow switching to a polarized lens auxiliary lens for fishing or an amber lens for skiing. Additional lifestyle lenses can be applied for such activities as flying, golfing, and hunting.

The lenspiece (which may also be referred to as a "lens clip") can be a single piece to ease installation. That is, the rimwire and lens or lenses are made as a unitary body that is attached to eyeframe as a whole. By being one piece, the lenspiece can be installed by holding the lenspiece in a first hand while the other hand operates the closure.

The invention provides a set of eyeglasses that can include lenses that are preferred or required for an occupation. The same frames can then be reused with different lenses for recreational use. By being usable for both occupational and recreational uses, the wearer can save the expense of having to buy two frames. Because the wearer only needs to buy one frame, instead of multiple frames, the wearer may be encouraged to pay more for the multiple-use frame.

In addition, a plurality of interchangeable lenses can be incorporated simultaneously. A first set of interchangeable lenses can be placed against the rim. A second set of interchangeable lenses are then added over the first set. Both interchangeable lenses would be held to the rimwire by the closure.

In accordance with a further object of the invention, the magnetic closure includes a groove and a tongue that seats in the groove to help the closure lock with the bridge. In particular, a groove can be formed in the nose bridge or the closure nose bridge. A tongue that fits in the groove is placed in the other of the nose bridge or the closure nose bridge. The inclusion of a groove and tongue allows the closure to mechanically seat within the closure. This type of groove and tongue mechanical closure when combined with a magnetically closed bridge creates a very strong closure. Unlike purely magnetic closures, a magnetic-mechanical closure using a groove and tongue as well as magnets is wiggle free and prevents the bridge from moving slightly which can allow the interchangeable lens to jiggle.

In accordance with a further object of the invention, the bridge is held in a closed position by magnetic forces to the eyeframe. The magnetic closure is formed by two magnetic fasteners that are magnetically attracted to each other. Magnetic closure and magnetic fastener are broad terms meant to include any type of closures that utilize magnetic force to hold the bridge closed.

The magnetic closure can be formed by a magnetic fastener that is a permanent magnet and the other magnetic fastener is made from magnetic material (i.e. ferromagnetic or paramagnetic material) that can be magnetically attracted to the permanent magnetic fastener. Descriptions of magnetic materials are described in Serway, Physics for Scientists and Engineers with Modern Physics, 3d ed., Chapter 30, pp 835-873, which is incorporated into the specification by reference. The magnetic fastener that is a permanent magnet can be made from ferromagnetic material that has had its magnetic poles aligned. Examples of ferromagnetic materials iron, cobalt, nickel, gadolinium, and dysprosium.

The magnetic closure can also be made from two permanent magnetic fasteners. In this case, the magnetic poles of the permanent magnetic fasteners should be aligned to allow the two permanent magnetic fasteners to attract each other (and not repel each other).

While permanent ferromagnets are preferred, other magnets can be used in the magnetic closure. For example, the magnetic closure could include an electromagnet.

In accordance with a further object of the invention, the magnetic fasteners can be connected to the eyeframe, in particular the nose bridge, and to the closure. The magnetic fasteners may be cemented, welded, soldered, forged, or glued to the frame. This method of connecting the magnetic fastener is the least expensive but results in the magnetic fastener being visible when the closure is in an opened position.

The magnetic fasteners may be enclosed within the eyeframe. For example, the magnetic fasteners may be enclosed by having the eye frame bent around the magnetic fastener. The magnetic fasteners can be embedded within the eyeframe and the closure by having the material of the eyeframe or closure formed around the magnetic fasteners. The magnetic fasteners still attract each other through the material of the eyeframe (i.e. the bridge) and the closure. The advantage of embedding the magnetic fastener within the frame is that it is not visible. Accordingly, the magnetic fasteners do not disturb the aesthetic properties of the frame.

In accordance with a further object of the invention, the eyeframe and closure themselves can be formed from magnetic material. For example, the bridge itself can be made of ferromagnetic or paramagnetic material. Likewise, the closure itself can be made of ferromagnetic or paramagnetic material. Then, as long as at least one of the bridge or the closure is magnetized to be a permanent magnet, it will attract the other. When either the eyeframe or bridge is made of magnetic material, the other can still use a magnetic material insert as well.

A further object of the invention is to provide eyeframes with an interchangeable lenspiece that attaches magnetically and has the magnets hidden so the magnets are not visible when the eyeglasses are worn.

For purposes of understanding the invention, directions are given with reference to how eyeglasses are worn. That is, "front" is meant to mean looking at a face of a wearer. "Left" means, while looking at the eyeglasses on a wearer, to the left. "Downward" and "beneath" mean looking at the eyewear while on a face of a wearer, the downward direction. "Upward" and "upon" mean, while looking at the eyewear while being worn on a face of a wearer, the upward direction.

The invention encompasses an eyeframe for releasably holding an interchangeable lenspiece. Lenspieces are also known as "lens clips". The eyeframe includes a rimwire and a closure. The rimwire forms a first lens frame, a second lens frame, and a bridge. The bridge interconnects the first lens frame and the second lens frame and has a first magnetic fastener. The closure has a closure bridge and a leg. The closure bridge has a second magnetic fastener and is disposed beneath the bridge when closed. The leg is configured to hold the lenspiece against said rimwire. The first magnetic fastener and the second magnetic fastener are magnetically attracted to each other to hold the closure releasably closed on the eyeframe.

By placing the closure bridge beneath the rimwire bridge, the closure bridge snaps closed. The shape of closure and the bridge require extra force to snap the closure closed. This same configuration tends to holds the closure closed until the closure is unsnapped. As the closure is used repeatedly the closure may lose its snapping qualities. The snapping quality may be lost due to wear or bending of the material, especially, if the material is metal or a polymer.

The inclusion of a magnetic fastener that tends to hold the closure in a closed position helps to make an effective closure even when the rest of the frame has been worn down with usage.

The eyeframe includes a hinge for swiveling the closure from a closed to an open position. The hinge interconnects the rimwire and the closure. The closure pivots on the hinge relative to the rimwire in order to open and close. A leg or other part of the closure can run from the hinge to the closure bridge to hold the removable lenspiece on the eyeframe.

The bridge of the eyeframe, against which the closure can snap, can be a nose bridge. By being a nose bridge, the overlying closure can be connected by the hinge on the eyeframe and closure bridge can also be a nose bridge. By utilizing the eyeframe nose bridge and the closure nose bridge, the impact (that is, the change in appearance relative to eyeglasses without an auxiliary lens) is minimized.

The bridge can be oriented with the hinge being lower than the magnetic fastener. That is, the closure can be oriented upside down to the closure shown in FIG. 10. This can be done by placing the hinge over the nose bridge and by having the closure bridge overly the brow bridge of the eyeframe. In this orientation, the closure bridge could be above the brow bridge. A magnetic fastener is placed in the brow frame and the closure bridge.

The closure bridge can abut (i.e. directly contact) the eyeframe bridge when the closure is in a closed position. By having the eyeframe bridge and the closure bridge abut when the closure is closed, the closure can be held together mechanically as well as magnetically.

In accordance with a further object of the invention, the magnets are not visible. In particular, the magnets are not visible when the lenspiece is installed and the closure is closed. The magnets in the eyeframe, the lenspiece, and the closure are hidden within the frame so they are not visible when the lenspiece is installed and the closure is closed. In this way, the eye wear looks more like traditional eyewear (i.e. without magnets or interchangeable lenspieces).

The bridge of the eyeframe can have a flat lower surface. The lower surface is the surface that contacts the closure bridge when the closure is in a closed position. The closure bridge can have a flat upper surface. By both being flat, the flat lower surface of the bridge abuts the flat upper surface of the closure bridge.

The eyeframe and closure are releasably held closed magnetically. To create the magnetism, at least one of the magnetic fasteners is a magnet. The other magnetic fastener can be a material that is attracted by a magnetic such as a ferrous magnetic material, like iron. The other magnetic fastener additionally can itself be a magnet, in particular, a permanent magnet. The two magnetic fasteners attract each other when the closure is in a closed position. When both of the magnetic fasteners are permanent magnets, the magnetic poles of the magnetic fasteners are aligned so that the magnetic fasteners attract each other when the closure is in the closed position. Because one magnetic fastener is under the other magnetic fastener, this means that the magnetic pole should be aimed downward. The downward pole could be a magnetic north or south pole. Again, if the other magnetic faster is also a magnet, its pole is aligned with the other magnetic fasteners.

A lenspiece (also known as a "lens clip") can be used with the eyeframe. The lenspiece can have a rimwire and at least one lens. The rimwire forms a lenspiece bridge. The closure closes over the lenspiece to secure the lenspiece to the eyeframe by sandwiching the lenspiece between the closure and the eyeframe. The rimwire of the lenspiece can form a lenspiece bridge. The lenspiece bridge can be held by the closure. By holding the lenspiece bridge, the closure does not obstruct or scratch any lenses held by the lenspiece.

The lenspiece can hold primary or auxiliary lenses. The lenses can be prescription, sunglass, or plano. Other types of lenses are possible. The lenspiece is removed by opening the closure. Different lenspieces or no lenspiece can be inserted. In this way, the same eyeframe can be used with different lenses and lenspieces.

The lenspiece bridge can rest upon the bridge. Resting the lenspiece bridge upon the eyeframe bridge provides an easy way to properly locate the lenspiece when attaching the lenspiece to the eyeframe. Resting the lenspiece bridge on the eyeframe bridge also helps to steady the lenspiece as the closure is being closed. Resting the lenspiece bridge on the eyeframe bridge has an additional benefit of minimizing the thickness of the assembly at the bridge.

The lenspiece can include a magnetic fastener. The magnetic fastener is magnetically attracted to a magnetic fastener in the bridge of the eyeframe. The lenspiece magnetic fastener is made from magnetic material such as iron. Rare earth magnets are also possible. The magnetic fastener can be a permanent magnet or other magnet such an electromagnet. The magnetic fastener in the eyeframe is preferably in a location that is sufficiently close the magnetic material in the lenspiece that sufficient magnetic attraction occurs to hold the weight of the lenspiece on the eyeframe. An example of close proximity is when the magnetic fasteners are disposed in the lenspiece bridge and the eyewear bridge, respectively.

In addition to attaching magnetically, the lenspiece and the eyeframe can include means for mechanically attaching to each other in addition to the closure itself. The lenspiece and eyeframe can include a tongue and recess for receiving the tongue. The tongue may be on either the lenspiece or the eyeframe. Likewise, the recess for receiving the tongue may be formed in the lenspiece or the eyeframe. However, forming the recess on the eyeframe has the advantage of being more hidden than a tongue on the eyeframe during times when no lenspiece is installed. The recess complements the shape of tongue so the tongue can be seated in the recess. The cross section of the tongue and the recess is preferably non-circular. By being non-circular, the tongue will be prevented from turning within the recess. When the tongue is disposed on the lenspiece, the magnetic fastener can itself be the magnetic fastener or it can hold the magnetic fastener.

A means for attaching the eyeframe to the lenspiece can be both magnetic and mechanical. For example, the tongue and groove, which connect to each other mechanically by the tongue seating in the groove, also can be magnetic fasteners. The tongue and groove can be made of magnetic material or contain a magnet or magnets inside of each other.

To further stabilize the lenspiece on the eyeframe additional tongues can be added to either the eyeframe or the lenspiece. Having multiple tongues prevents twisting of the lenspiece relative to the eyeframe.

The eyeframe can include a hook for holding the lenspiece to the eyeframe. The hook can be disposed on the lenspiece or on the eyeframe. The width of the hook is wide enough to accommodate either the eyeframe or the lenspiece, whichever is not fixed to the hook.

When the lenspiece bridge rests upon the eyeframe bridge, the hook can be disposed on an upper portion (i.e. above the eyeframe bridge) of the eyeware bridge. By being disposed on an upper portion, the lenspiece can be held between the hook and eyeframe bridge. More than one hook can be used to secure the lenspiece to the eyeframe. Placing a hook on each lens frame and at least partially off center means the hooks will not only stabilize the lenspiece vertically but also prevent lateral movement.

The invention encompasses a system that includes the eyeframe as described above along with a plurality of different lenspieces. The lenspieces are exchangeable. The different lenspieces can provide different looks as well as different function. For example, the shading in one lenspiece might be amber and in another mirrored. The material of one of the lenspieces might be glass and another plastic. The shape of different lenspieces can be different as well. By using different lenspieces the lenspiece can be changed while the expense of the underlying eyeframe is saved.

The system is particularly useful in wearers where the system includes a primary lens that is a prescription lens and different non-prescription auxiliary lenspieces are included. A first lenspiece might be polarized and the second lenspiece might be non-polarized. Because the primary lens is the prescription lens, the auxiliary lens can be bought off-the-shelf. Accordingly, the cost of the lenspiece is reduced compared to prescription lenspieces. Retailers can keep small inventories of lenspieces because a variety of lenses for different prescriptions are not necessary.

The lenspiece does not need to rest upon the eyeframe before the closure is closed; the lenspiece can be beneath the eyeframe and then secured by the closure. The lenspiece can be placed beneath the bridge (i.e. the nose bridge) and then the closure can be closed to secure the lenspiece. The lenspiece can be held by the wearer against the eyeframe until the closure is closed. Mechanical devices such as screws and clamps can be used to hold the lenspiece to the eyeframe before the closure is closed. The lenspiece may be magnetic in order to hold the lenspiece to the eyeframe before the closure is closed. Once the closure is closed, the closure is beneath the lenspiece and the eyeframe.

Other features that are considered as characteristic for the invention are set forth in the appended claims.

Although the invention is illustrated and described herein as embodied in an eyeframe for use with interchangeable lenses, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. It is accordingly an object of the invention to provide an eyeframe with interchangeable lenspieces held by a magnetic closure and interchangeable lens system that overcomes the above-mentioned disadvantages of the heretofore-known devices and methods of this general type.

BRIEF DESCRIPTION OF THE SEVERAL VIEWS OF THE DRAWING

FIG. 3 is a partial, enlarged diagrammatic front elevational view of the first embodiment of the eyeframe shown in a closed position and holding the interchangeable lens.

FIG. 4 is a partial, enlarged front side view of the first embodiment of the eyeframe shown in the open position.

DETAILED DESCRIPTION OF THE INVENTION

Figure 1:
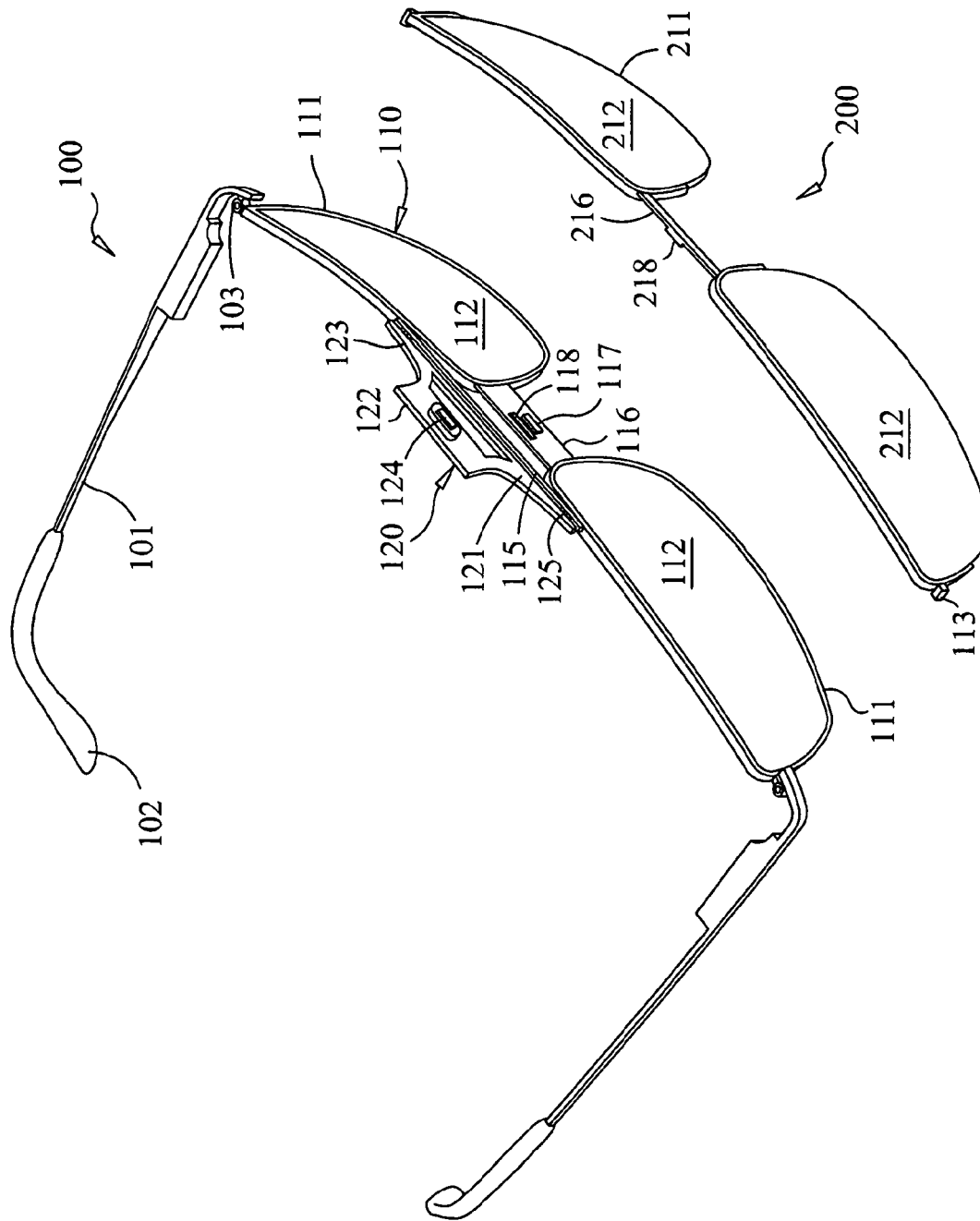
FIG. 1 is a diagrammatic front elevational view of a first embodiment of an eyeframe with a nose bridge and brow bridge and that is shown in an open position and an interchangeable lens, both according to the invention.

Referring now to the figures of the drawing in detail and first, particularly, to FIG. 1 thereof, there is seen an eyeframe that is generally marked with reference number 100. Like most eyeframes, the eyeframe 100 includes two stems 101. Each stem 101 has an earpad 102. Each stem 101 connects to a common rimwire 110 at a stem hinge 103.

The rimwire 110 is the front part of the eyeframe 100. The eyeframe rimwire 110 forms two loops, which are eyeframe lens frames 111. The eyeframe lens frames 111 roughly overly a wearer's eye sockets when worn. The eyeframe lens frames 111 are interconnected by an eyeframe nose bridge 116. The eyeframe nose bridge 111 overlies a wearer's nose when worn. In the embodiment shown in FIGS. 1-4, a eyeframe brow bridge 115 additionally interconnects the eyeframe lens frames 111 and is disposed parallel to the eyeframe nose bridge 116. The eyeframe brow bridge 115 overlies a wearer's brow ridge when worn.

The embodiment shown has two primary lenses 112, each held within a respective lens frame 111. The primary lenses 112 that are shown are permanent lenses. In this embodiment, the primary lenses 112 are prescription lenses. In other embodiments, the primary lenses 112 can be any type of lenses such as sunglasses, single vision, plano lenses, bifocal lenses, trifocal lenses, progressive lenses, or safety lenses.

In the embodiment shown, the nose bridge 116 has a groove 118 formed in the nose bridge 116. The groove 118 is a shaped cavity, which is configured to hold a male tongue 218 that is described in detail below. A first magnetic fastener 117 is connected to the nose bridge 116. The first magnetic fastener 117 is a permanent magnet made from iron, a ferromagnetic material. The first magnetic fastener 117 has a magnetic north pole that is aligned outward, perpendicular to a wearer's face.

A closure 120 is connected to the rimwire 110. The closure 120 is generally trapezoidal shaped. The closure 120 has a long closure brow bridge 121 and a shorter, parallel closure nose bridge 122. Closure legs 123 are curved and interconnect the closure brow bridge 121 and the closure nose bridge 122. The closure 120 is configured (i.e. shaped and sized) so the closure brow bridge 121 overlies the brow bridge 115, so the closure nose bridge 122 overlies the nose bridge 116, and so each of the closure legs 123 overlies at a part of a respective one of the lens frames 111.

A second magnetic fastener 124 is connected to the closure nose bridge 122. The second magnetic fastener 124 is configured to overlap the first magnetic fastener 117 when the closure 120 is in a closed position as shown in FIG. 3. In the embodiment shown, the second magnetic fastener 124 is a permanent magnet made from iron, a ferromagnetic material. In the embodiment shown, the magnetic north pole of the second magnetic fastener 124 is aligned with the magnetic north pole of the first magnetic fastener. That is, the magnetic north pole of the second magnetic fastener 124 is aligned outward and perpendicular to a wearer's face. This allows the second magnetic fastener 124 and the first magnetic fastener to be mutually attracted.

Figure 2:
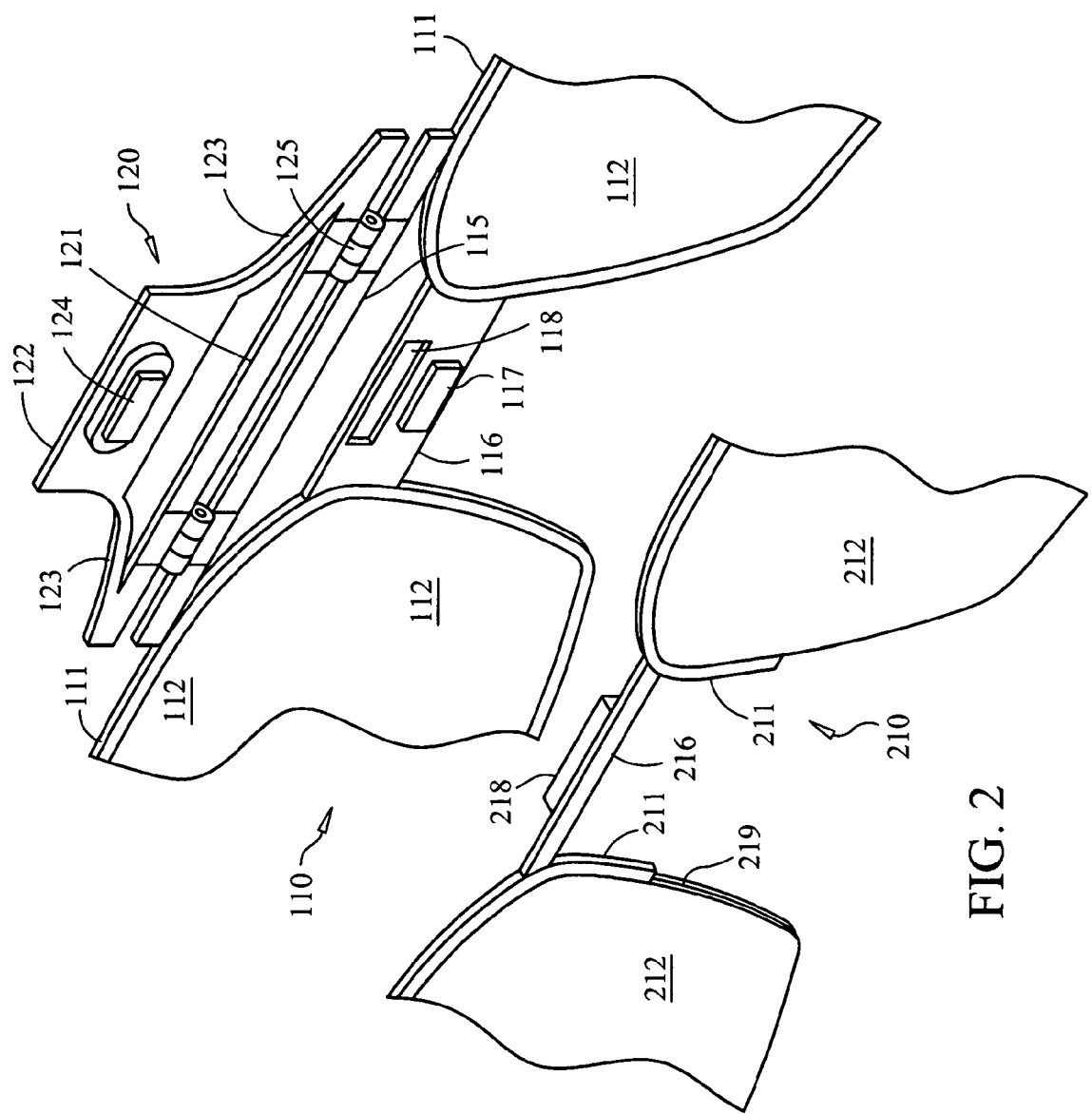
FIG. 2 is a partial, enlarged diagrammatic front elevational view of the first embodiment of the eyeframe in the opened position and the interchangeable lens.

Closure hinges 125 connect the closure 120 to the rimwire 110. In particular, the hinges 125 connect the closure brow bridge 121 to the brow bridge 115. The hinges 125 permit the closure 120 to pivot between an open position as shown in FIGS. 1, 2, and 4 and a closed position as shown in FIG. 3.

An interchangeable lenspiece 200 includes a lenspiece rimwire 210. The lens-piece rimwire 210 forms two lenspiece lens frames 211 that are interconnected by a lenspiece nose bridge 216. The lens-piece lens frames 211 hold the lenspiece lenses 212. The interchangeable lenspiece 200 is roughly congruent to the rimwire 110. The term "roughly congruent" for purposes of this application means sized and shaped so the lenspiece lenses 212 overly the lens frames 111 when the lens-piece nose bridge 216 overlies the nose bridge 116. In the preferred embodiment, the lenspiece lenses 212 are auxiliary lenses that augment the primary lenses 112. Preferably, the lenspiece lenses 212 are sunglass lenses. In other possible embodiments, the lenspiece lenses 212 can be reading lenses or prescription lenses.

A tongue 218 is attached to the lenspiece nose bridge 216 of the interchangeable lenspiece 200. The tongue 218 extends inward (i.e. toward a wearer's face) from the lenspiece nose bridge 216.

To attach the interchangeable lenspiece 200 to the eyeframe 100, the closure 120 is opened. To open the closure 120, the second magnetic fastener 124 is pried from the first magnetic fastener 117 and the closure 120 is opened by moving the closure relative to the rime wire 110 about the hinge 115. The interchangeable lenspiece 200 is then attached by inserting the tongue 218 into the groove 118. Next, the closure 120 is closed by placing the second magnetic closure 124 against the first magnetic closure 117. The interchangeable lenspiece 200 is thereby sandwiched between the closure 120 and the rimwire 110. In particular, the lenspiece nose bridge 216 is sandwiched between the nose bridge 116 and the closure nose bridge 122. The fit of the tongue 218 within the groove 118 prevents the interchangeable lenspiece 200 from jiggling or shifting relative to the eyeframe 100.

A preferred embodiment of a system of interchangeable lenses includes one eyeframe 100 and a plurality of different interchangeable lenspieces 200. The various different interchangeable lenspieces 200 can be attached and combined with the eyeframe 100 depending on the situation. For example, an interchangeable lenspiece 200 with amber-tinted lenspiece lenses 212 can be used for skiing. The amber-tinted lenses can be removed and interchanged with a different interchangeable lenspiece 200 containing polarized lenspiece lenses 212 for fishing, glare reduction, driving, skiing, and hunting.

FIGS. 5-9 show a second embodiment of the eyeframe 100, wherein the eyeframe 100 has a nose bridge 116, but no brow bridge 115. A groove 118 is formed within the nose bridge 116 in approximately the center of the nose bridge 116. A first magnetic fastener 117 is disposed on the nose bridge 116 lower than the groove 118.

In the second embodiment, the closure 120 is connected to the nose bridge 116 by the closure hinges 125. The closure 120 is roughly congruent with the nose bridge 116. A second magnetic fastener 124 is disposed on the inside bottom (bottom when closed, top when open) of the closure so as to overlap the first magnetic fastener 117 when the closure is closed. A lip extends below the second magnetic fastener 124 and allows the closure 120 to be easily pried open.

An interchangeable lenspiece 200 of the second embodiment is similar to the interchangeable lenspiece 200 of the first embodiment. The interchangeable lenspiece 200 includes a lenspiece rimwire 210 that is interchangeable. Interchangeable means separateable from the eyeframe 100 and replaceable with another lenspiece rimwire 210. The interchangeable rimwire 210 forms two interchangeable lens frames 211. Each lens frame 211 holds a respective lenspiece lens 212. In the embodiment shown, the lenspiece lens 212 is a secondary (also known as an "auxiliary") lens. The lenspiece lens 212 can be primary lens. A lenspiece nose piece 216 interconnects the two lenspiece lens frames 211. A tongue 218 is connected to the lenspiece nose bridge 216 and extends inward (i.e. toward a wearer's face). The tongue 218 complements the groove 118 and inserts into the groove. Preferably, the tongue 218 is rectangular and fits snugly within the groove 118; the rectangular shape prevents the tongue 218 and interchangeable lenspiece 200 from rotating and jiggling relative to the eyeframe 100.

The closure hinge 125 is disposed behind the closure 120. By being behind the closure 120, the closure hinge 125 is not visible when the closure 120 is in a closed position. See FIG. 7.

The closure hinge 125 is disposed on the front, near the top of the nose bridge 116. The groove 118 is in the middle of the nose bridge 116. The interchangeable nose piece 216 should not overly the closure hinge 125; this configuration allows the closure to be as thin as possible. The first magnetic fastener 117 is near the bottom of the nose bridge 116.

Figure 5:
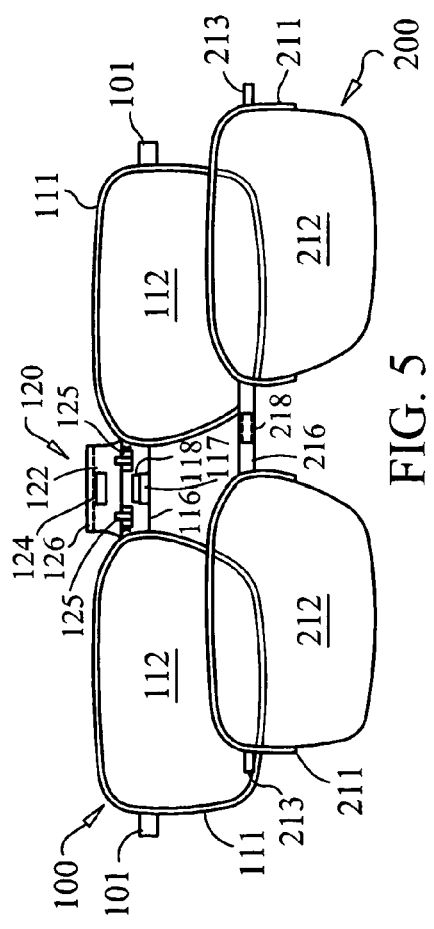
FIG. 5 is front side view of a second embodiment of the eyeframe, which has only a nose bridge, and of the interchangeable lens, a closure of the eyeframe is in an open position.
Figure 6:
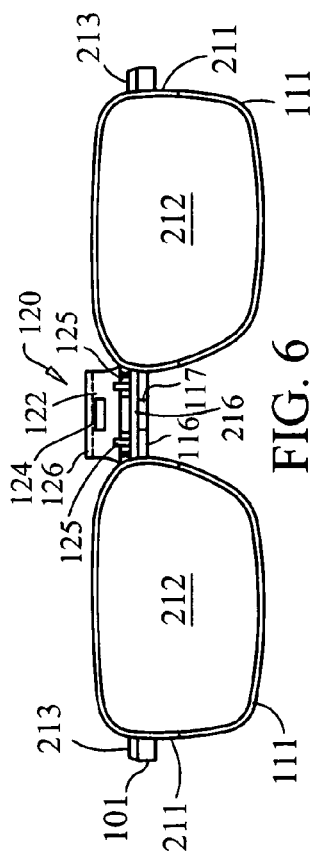
FIG. 6 is a front side view of the second embodiment of the eyeframe with the interchangeable lens engaging the eyeframe, the closure of the eyeframe is in an on open position.
Figure 7:
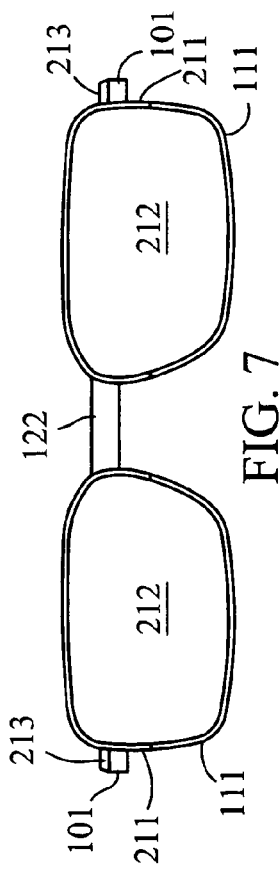
FIG. 7 is a front side view of the second embodiment of the eyeframe with the interchangeable lens held by the closure, which is in a closed position.
Figure 8:
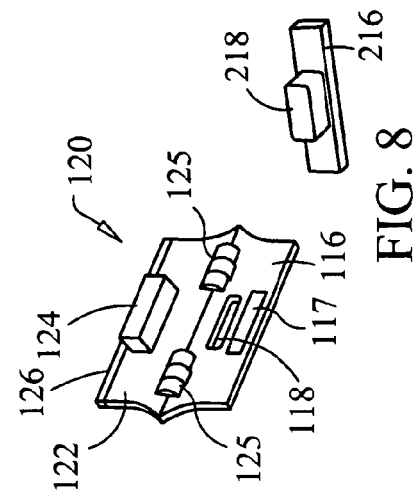
FIG. 8 is a front perspective, partial view of a nose bridge of the second embodiment of the eyeframe, the nose bridge is in the open position, and a rear perspective, partial view of a nose bridge of the interchangeable lens.
Figure 9:
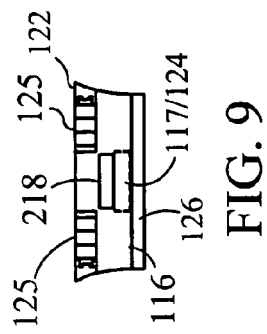
FIG. 9 is a rear side view of the nose bridge of the second embodiment of the eyeframe, the nose bridge is in the closed position.

To use the second embodiment of the invention, the closure 120 is opened as shown in FIG. 5. The tongue 218 of the interchangeable lenspiece 200 is inserted into the groove 118 in the nose bridge 116 as shown in FIG. 6. In FIG. 5, the tongue 218 is shown in phantom because the tongue 218 is disposed on the rear of the lenspiece nose bridge 216 and would not otherwise be visible in a front view. The closure 120 is then closed by rotating the closure 120 about the closure hinge 125 and bringing the first magnetic fastener 117 near the second magnetic fastener 124 as shown in FIG. 7. To open the closure 120, the closure is lifted by the lip.

FIGS. 10 and 10A-10C show a first embodiment of an eyeframe 100 with a magnetic closure 120 that connects magnetically beneath the eyeframe nose bridge 116. The eyeframe 100 has a rimwire 110. The rimwire 110 forms a right lens frame 111 and a left lens frame 111. Each lens frame 111 holds a respective primary lens 112. An eyeframe nose bridge 116 is generally horizontal and interconnects the lens frames 111. The eyeframe nose bridge 116 is in the middle of the height of the lens frames 111. The eyeframe nose bridge 116 overlies a wearer's nose. An eyeframe brow bridge 115 is horizontal and interconnects the eyeframes 111. The eyeframe nose bridge 116 runs across the top of the eyeframe 100 and overlies a wearer's eyebrows.

A closure 120 secures the lenspiece 200 to the eyeframe 100 by using magnetic force. In the embodiment shown, the closure 120 connects to the rimwire 110 along the brow bridge 115. Hinges 125 interconnect the rimwire 110 and the brow bridge 115 and allow the closure 120 to swivel between an open (FIGS. 10 and 10A) and closed (FIGS. 10B and 10C) position. A preferred embodiment of the closure 120 is generally trapezoidal. The closure 120 has a closure nose bridge 122 that is horizontal and is configured to be beneath the eyewear nose bridge 116 when the closure 120 is closed. Two laterally opposed legs 123 interconnect the closure bridge 122 and the hinges 125. The legs 123 are shaped to overly sections of the rimwire 110. As described below, the legs 123 hold the lenspiece 200 to the eyeframe 100. In the preferred embodiment, the closure nose bridge 122 mechanically snaps into place beneath the eyeframe nose bridge 116. The eyeframe nose bridge 116 has a flat horizontal bottom surface. The closure nose bridge 122 has a flat horizontal top surface. The flat upper surface of the closure nose bridge 122 tends to seat flat against the flat horizontal bottom surface of the eyeframe nose bridge 116. Once the closure 120 is closed, the closure 120 tends to stay close due to the closure nose bridge 116 lying abutting the eyeframe nose bridge 116.

A magnetic fastener 117 is disposed in the eyeframe nose bridge 116. The magnetic fastener 117 is a permanent magnet made of iron with a magnetic north pole aimed downward. The magnetic fastener 117 is flush with the flat horizontal bottom surface of the eyeframe nose bridge 116.

A magnetic fastener 124 is disposed in the closure nose bridge 122. In the preferred embodiment, the magnetic fastener 124 is a permanent magnet made of iron. The magnetic fastener 124 has a magnetic north pole facing downward when the closure 120 is in a closed position. The magnetic fastener 124 is flush with the horizontal flat upper surface of the closure nose bridge 122.

Figure 10:
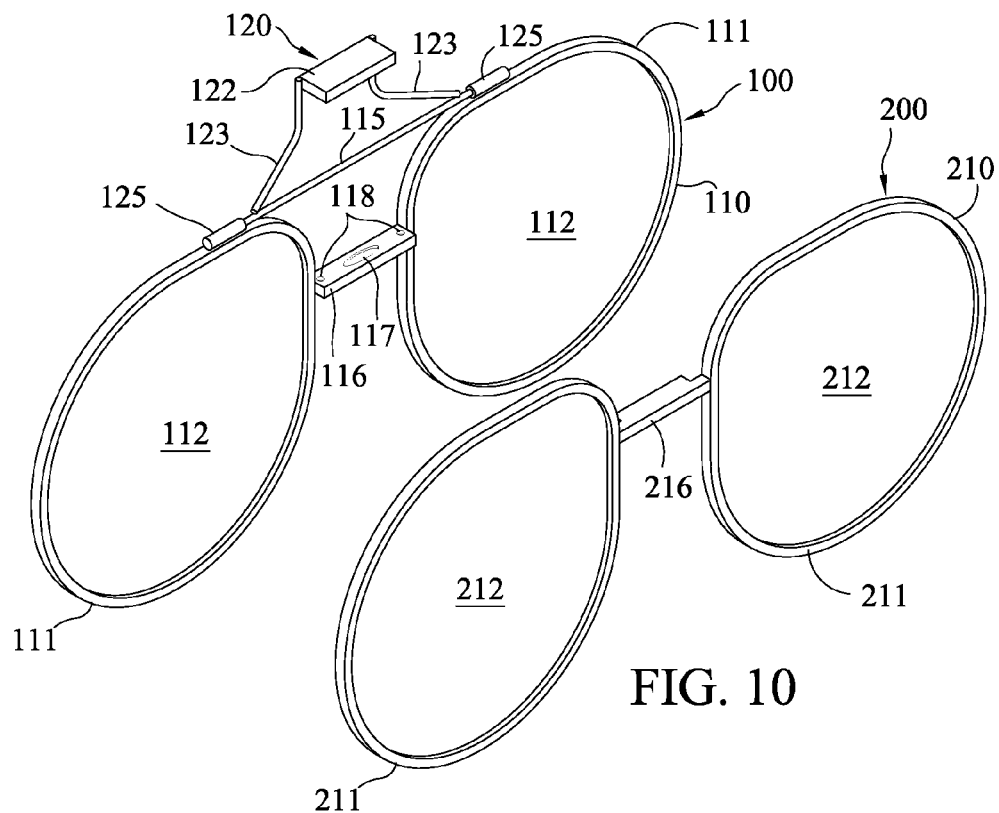
FIG. 10 is a top front left elevational view of a first embodiment of an eyeframe with a magnetic closure with a latch that connects beneath the eyeframe bridge. The first embodiment of the eyeframe bridge has laterally opposed grooves. The closure is in an open position.
Figure 10A:
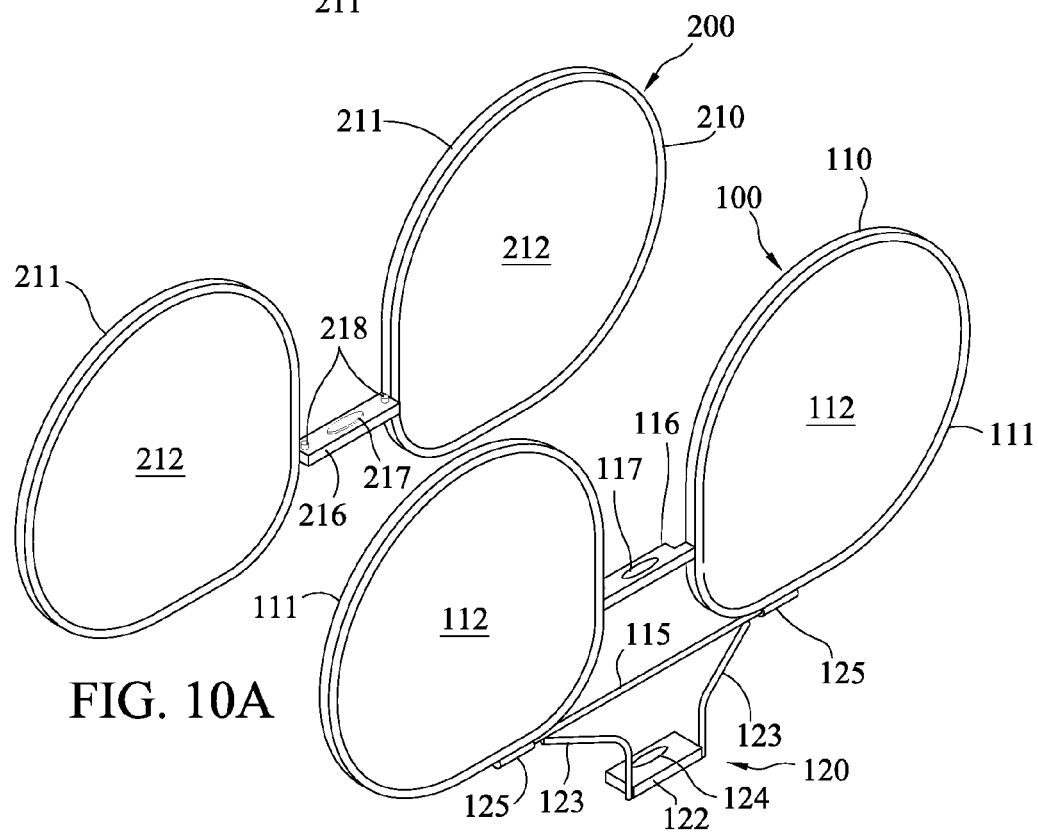
FIG. 10A is a bottom rear right elevational view of the eyeframe shown in FIG. 10. The lenspiece bridge has laterally opposed tongues.
Figure 10B:
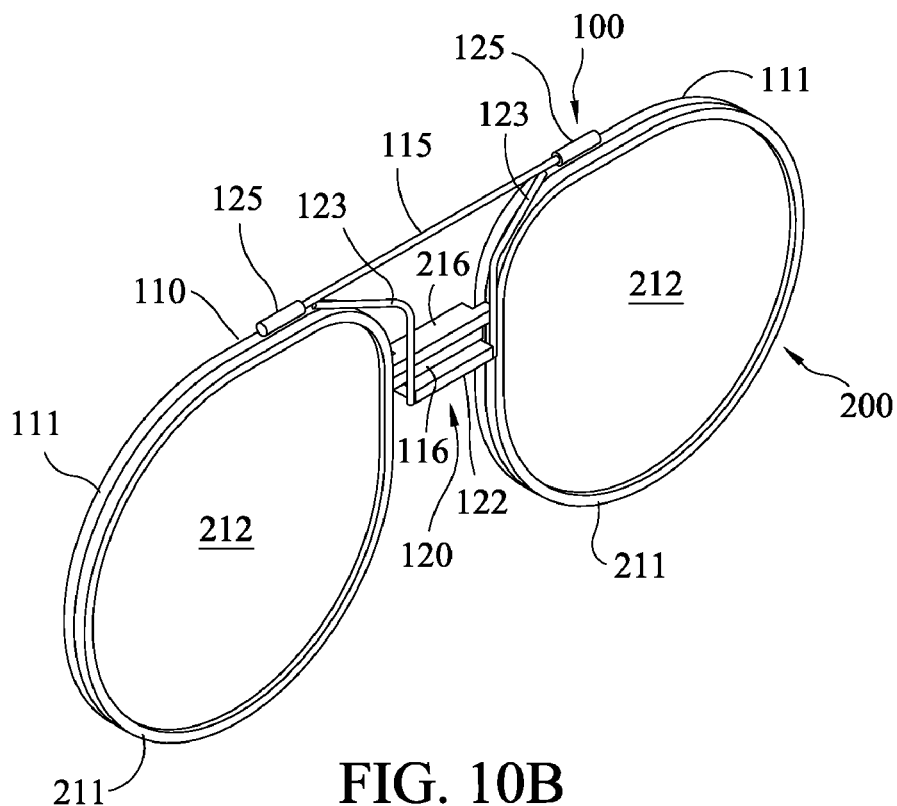
FIG. 10B is a top front left elevational view of the eyeframe shown in FIG. 10 with the lenspiece installed and the closure in a closed position.

When the closure 120 is closed as shown in FIG. 10B, the eyeframe nose bridge 116 is magnetically attracted to the closure nose bridge 122. The eyeframe nose bridge 116 has a magnetic fastener 117 disposed in the eyeframe nose bridge 116. The closure nose bridge 122 has a magnetic fastener 124 disposed in the closure nose bridge 122. The two magnetic fasteners 117 and 124 attract each other magnetically. The two magnetic fasteners 117 and 124 are not visible when the closure 120 is closed, as is the case in FIG. 10B. The magnetic force is strong enough to hold the closure closed under the weight of the eyepiece even if the mechanical part of the closure fails.

A lenspiece 200 is held on the eyeframe 100 by the closure 120 as shown in FIG. 10B. The construction of the lenspiece 200 is shown in FIGS. 10, 10A, 10B, and 10C. The lenspiece 200 is formed by a rimwire 210. In the preferred embodiment, the rimwire 210 forms two lenspiece lens frames 211. In an embodiment that is not shown, the rimwire 210 forms a single lenspiece lens frame. Each lenspiece lens frame 211 holds a respective lenspiece lens 212. In the embodiment shown in the figures, the lenspiece rimwire 210 overlies the eyeframe rimwire 110 when the lenspiece 200 is installed on the eyeframe 100. The rimwire 210 also forms a lenspiece nose bridge 216. The lenspiece nose bridge 216 interconnects the two lenspiece lens frames 211.

In the preferred embodiment shown in FIGS. 10, 10A, 10B, and 10C, the lenspiece nose bridge 216 connects the lenspiece 200 to the eyeframe 100. The lenspiece nose bridge 216 is configured to overly the eyeframe nose bridge 116. The lenspiece nose bridge 216 is horizontal and is disposed in the middle, heightwise, of the lenspiece 200. The bottom surface of the lenspiece nose bridge 216 is horizontal and flat (with the exception of the tongues and magnetic fastener) and is configured to lie flat on the top surface of the eyeframe nose bridge 116.

Figure 10C:
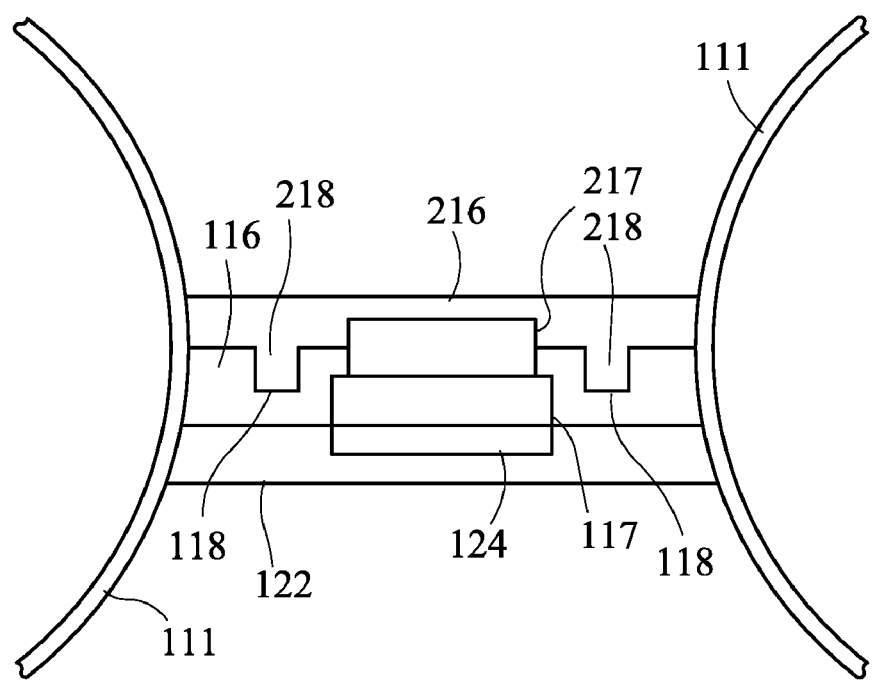
FIG. 10C is a sectional, partial front side view of the eyeframe shown in FIG. 10B.

As shown in FIGS. 10, 10A, and 10C, various tongues 218 and grooves 118 can be placed on the bottom surface of the lenspiece nose bridge 216 and the top surface of the eyeframe nose bridge 116 to connect mechanically the lenspiece nose bridge 216 and the eyeframe nose bridge 116. Preferably, the tongues 218 are disposed on the lenspiece 200 because the grooves 118 are more hidden than the tongues 218 when no lenspiece 200 is installed. In the embodiment shown, the tongues 218 are two cylinders extending downward from the lenspiece nose bridge 216; other shapes are possible. The tongues 218 are on laterally opposed sides (i.e. left and right) of the lenspiece nose bridge 216. Respective grooves 218 are formed in the top surface of the eyeframe nose bridge 216. The grooves 218 receive the tongues 218. By having two tongues 218, the lenspiece 200 is prevented from twisting or shifting with respect to the eyeframe 100.

The lenspiece 200 is held magnetically to the eyeframe 100. The lenspiece nose bridge 216 and the eyeframe nose bridge 116 each have a magnetic fastener 217 and 117, respectively. The magnetic fasteners 217 and 117 are magnetically attracted to each other. Preferably, but not necessarily, the magnetic force is great enough to hold the lenspiece 200 on the rimwire 100 without additional mechanical assistance. Preferably, both magnetic fasteners 217 and 117 are made of ferrous magnetic material, such as iron, but other magnetic materials such as rare earth metals are possible. While at least one of the magnetic fasteners 217 and 117 is a permanent magnet, preferably both of the magnetic fasteners 217 and 117 are permanent magnets. When both of the magnetic fasteners 117 and 217 are permanent magnets, the magnetic poles of the magnetic fasteners are aligned so that the magnetic fasteners 117 and 217 attract each other when the lenspiece 200 is attached to the eyeframe 100. Preferably, when the magnetic fasteners 117 and 217 are permanent magnets, the permanent magnets are aligned: for example, with both magnetic north poles pointing downward.

Figure 11:
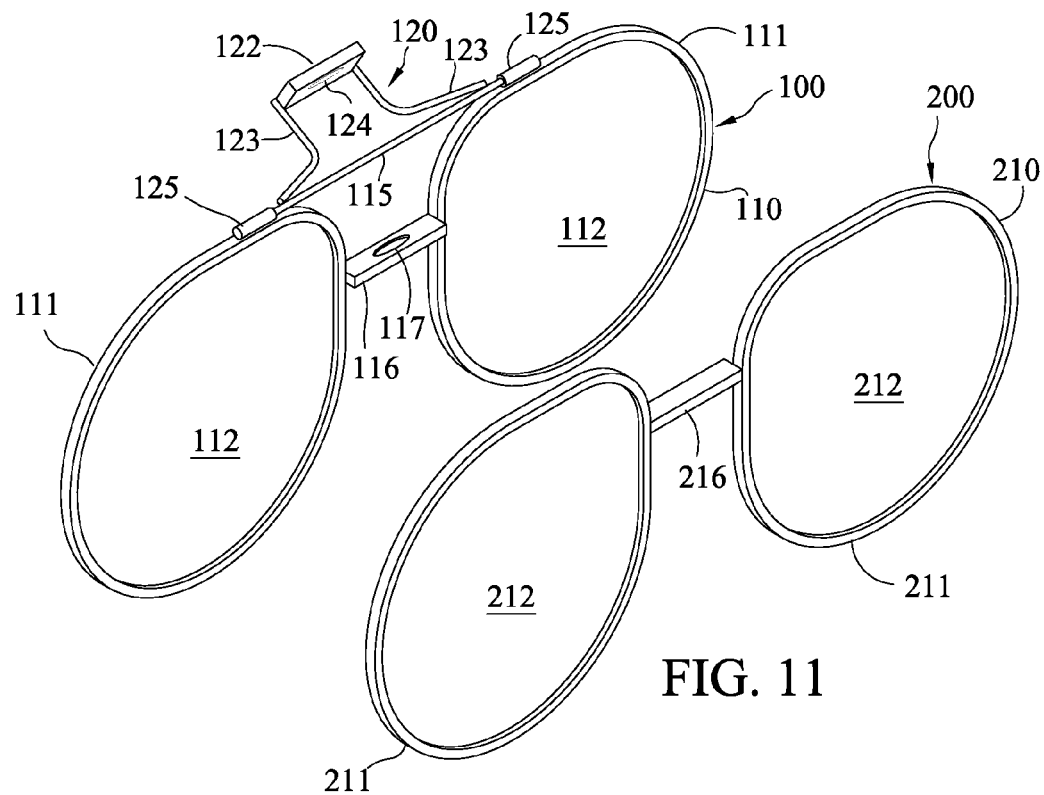
FIG. 11 is a top front left elevational view of a second embodiment of an eyeframe with a magnetic closure with a latch that connects beneath the eyeframe bridge. The second embodiment of the eyeframe bridge has no laterally opposed grooves. The closure is in an open position.
Figure 11A:
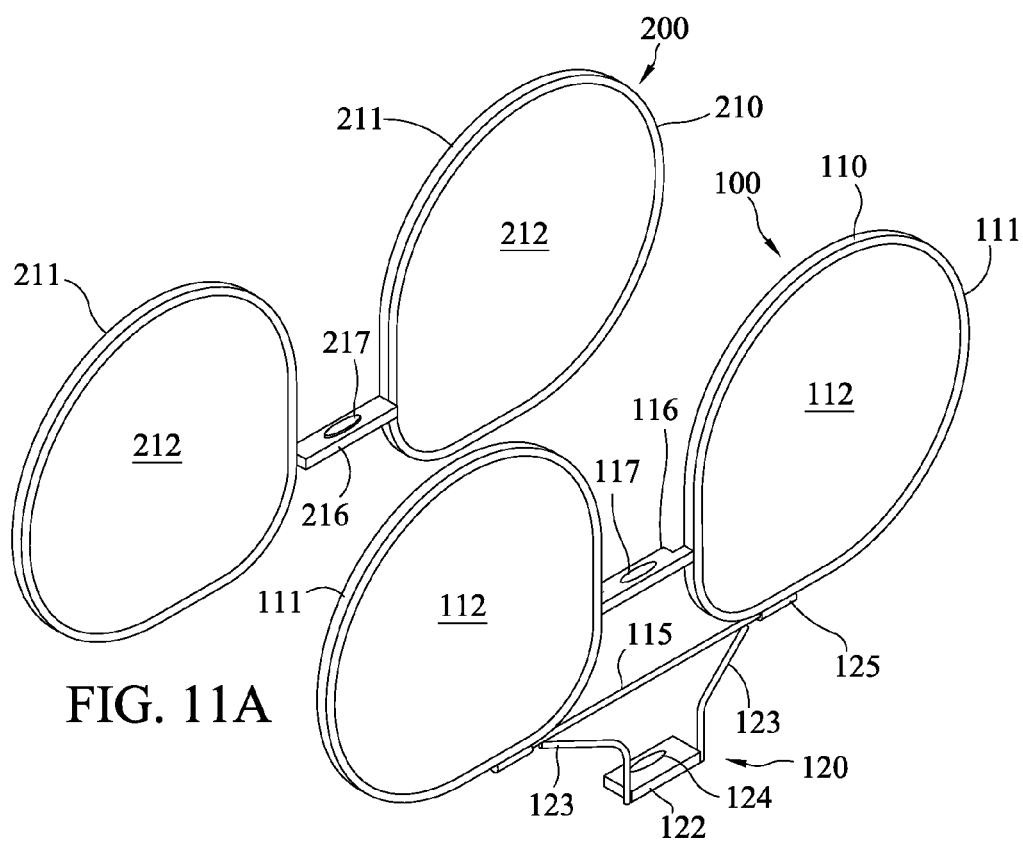
FIG. 11A is a bottom rear right elevational view of the eyeframe shown in FIG. 11. The lenspiece bridge has no laterally opposed tongues.
Figure 12:
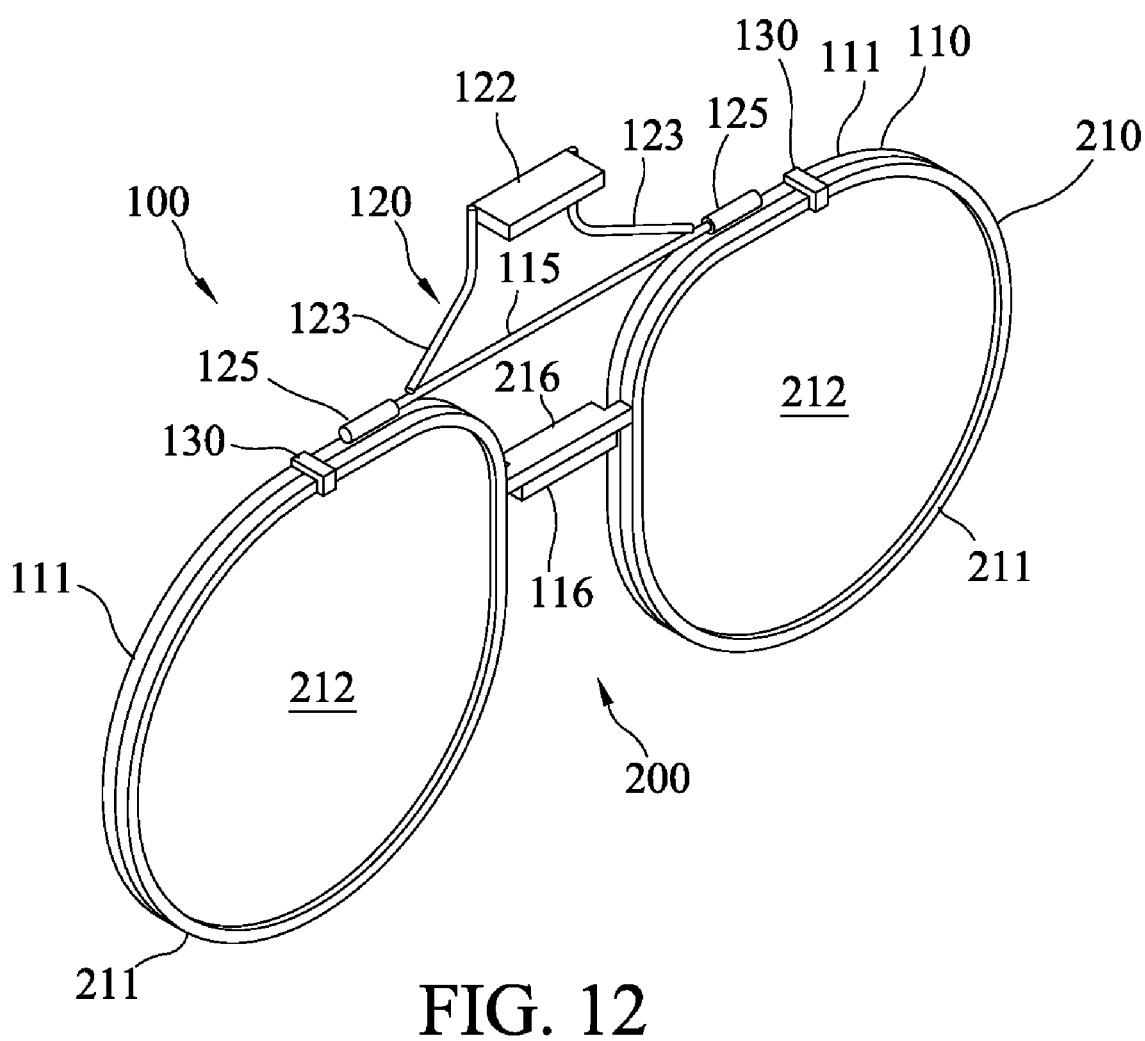
FIG. 12 is a top front left elevational view of a third embodiment of an eyeframe with a magnetic closure with a latch that connects beneath the eyeframe bridge and with hooks on the frame.

In the embodiments shown in FIGS. 10-12, the magnetic fastener 217 (FIGS. 10A and 11B) forms a tongue (i.e. a male connector) that is received in a groove (i.e. a female connector) formed in the eyeframe nose bridge 116. The shapes of the tongue and groove complement each other. Preferably, the magnetic fastener 217 has a shape that prevents rotation (i.e. not circular; such as an oval) when the magnetic fastener 217 is inserted in the groove. The magnetic fastener 117 is seated in the eyeframe nose bridge 116 at the bottom of the groove. The magnetic fasteners 117 and 217 are aligned to attract each other. Preferably, both magnetic fasteners 117 and 217 are both permanent ferrous magnets with North poles directed downward.

In an embodiment that is not shown in the figures, the magnetic fastener 117 of the eyeframe nose bridge 116 forms a tongue (i.e. male connector) that seats in a groove formed in the lenspiece nose bridge 216. The magnetic fastener 217 is disposed in the lenspiece nose bridge 216 at the top (i.e. inward) of the groove.

As shown in FIG. 12, hooks 130 can be added to the rimwire 110. The hooks 130 hold the lenspiece 200 to the eyeframe 100 and more specifically the rimwire 210 of the lenspiece 200 to the rimwire 110 of the eyeframe 100. The hooks 130 have an opening that is wide enough to receive a lenspiece 200. The hooks 130 are preferably as wide as the lenspiece 200 in order to hold the lenspiece 200 securely to the eyeframe 100. Preferably, the hooks 130 are disposed on the rimwire 110 above (i.e. higher than) the eyeframe nose bridge 116 so that the lenspiece 200 can be held between the eyeframe nose bridge 116 and the hooks 130.

In an embodiment that is not shown in the figures, the lenspiece nose bridge 216 includes a lenspiece magnetic fastener 217. The lenspiece nose bridge is placed beneath the eyeframe nose piece 116. The eyeframe nose piece 116 includes a magnetic fastener 117. The lenspiece 200 is held to the eyeframe 100 by the magnetic attraction between the magnetic fasteners 117 and 217. The closure 120 is then closed with the closure bridge 122 beneath the lenspiece nose bridge 216 and the eyeframe nose bridge 116.

While the figures and the text describe preferred embodiments of the invention, the embodiments should not be read to limit the scope of the invention.

I claim:

1. An eyeframe for releasably holding an interchangeable lenspiece, comprising:
    a rimwire forming a first lens frame, a second lens frame, and a bridge, said bridge interconnecting said first lens frame and said second lens frame and having a first magnetic fastener; and
    a closure having a closure bridge and a leg, said closure bridge having a second magnetic fastener and being disposed above or below said bridge when closed, said leg being configured to hold the lenspiece against said rimwire;
    said first magnetic fastener and said second magnetic fastener being magnetically attracted to each other to hold said closure releasably closed on said eyeframe.

2. The eyeframe according to claim 1, further comprising a hinge interconnecting said rimwire and said closure, said closure pivoting on said hinge relative to said rimwire in order to open and close.

3. The eyeframe according to claim 1, wherein said bridge is a nose bridge.

4. The eyeframe according to claim 1, wherein said bridge and said closure bridge abut each other.

5. The eyeframe according to claim 1, wherein:
    said bridge has a flat lower surface;
    said closure bridge has a flat upper surface; and
    said flat lower surface of said bridge abuts said flat upper surface of said closure bridge.

6. The eyeframe according to claim 1, wherein at least one of said magnetic fasteners is a permanent magnet.

7. The eyeframe according to claim 6, wherein:
    both of said magnetic fasteners are permanent magnets; and
    said permanent magnets are aligned with each other to attract each other when said closure is closed.

8. The eyeframe according to claim 1, wherein said magnetic fastener of said bridge has a magnetic pole aimed downward.

9. The eyeframe according to claim 1, wherein said magnetic fastener of said closure bridge has a magnetic pole aimed downward.

10. The eyeframe according to claim 1, further comprising a lenspiece having a lenspiece bridge, said lenspiece being held between said closure and said rimwire when said closure is closed.

11. The eyeframe according to claim 10, wherein said lenspiece bridge rests upon said bridge.

12. The eyeframe according to claim 10, wherein:
    said lenspiece has a third magnetic fastener; and
    said third magnetic fastener is attracted to said first magnetic fastener of said bridge.

13. The eyeframe according to claim 10, further comprising:
    a tongue disposed on said lenspiece bridge; and
    said bridge has a recess formed therein for receiving said tongue.

14. The eyeframe according to claim 13, wherein said tongue includes said third magnetic fastener.

15. The eyeframe according to claim 13, further comprising a further tongue disposed on said lenspiece bridge; and
    said eyepiece bridge has a further socket formed therein for receiving said tongue.

16. The eyeframe according to claim 13, further comprising a further tongue disposed on said bridge; and
said lenspiece bridge has a further socket formed therein for receiving said further tongue while said tongue is disposed in said socket.

17. The eyeframe according to claim 1, further comprising a hook disposed on an upper portion of one of said lens frames, said hook being configured to secure the lenspiece when inserted in said hook.

18. The eyeframe according to claim 1, further comprising:
a first hook disposed on an upper portion of said first lens frame; and
a second hook disposed on an upper portion of said second lens frame;
said hooks being configured to secure the lenspiece when inserted in said hook.

19. An eyewear system with interchangeable lens pieces, comprising:
a first lenspiece including a rimwire holding a lens;
a second lenspiece including a rimwire holding a lens;
a rimwire forming a first lens frame, a second lens frame, and a bridge, said bridge interconnecting said first lens frame and said second lens frame and having a first magnetic fastener;
a closure having a closure bridge and a leg, said closure bridge having a second magnetic fastener and being disposed beneath said bridge when closed, said leg being configured to hold one of said lenspieces at a given time against said rimwire; and
a hinge interconnecting said rimwire and said closure, said closure pivoting on said hinge relative to said rimwire in order to open and close;
said first magnetic fastener and said second magnetic fastener being magnetically attracted to each other to hold said closure releasably closed on said eyeframe.

20. An eyeframe, comprising:
a lenspiece having a lenspiece bridge with an oval-shaped permanent magnet fastener protruding downward and two laterally-opposed tongues protruding downward;
a rimwire forming a first lens frame, a second lens frame, and a nose bridge, said nose bridge interconnecting said first lens frame and said second lens frame, having an iron fastener and a flat lower surface, and supporting said lenspiece nose bridge; said permanent magnet fastener of said lenspiece being attracted to said iron fastener; said nose bridge having an oval-shaped recess formed in an upper surface thereof, said oval-shaped recess receiving said oval-shaped permanent magnet fastener; said nose bridge having two laterally opposed recesses receiving said tongues; and
a closure having a closure nose bridge and a leg, said closure nose bridge having a flat upper surface and a permanent magnetic fastener and being disposed beneath said bridge when closed, said leg being configured to hold said lenspiece bridge against said rimwire;
said flat lower surface of nose bridge abutting said flat upper surface of said closure nose bridge when said closure is closed;
said iron magnetic fastener and said permanent magnetic fastener being magnetically attracted to each other to hold said closure releasably closed on said eyeframe.

* * * * *